United States Patent
Noy et al.

(10) Patent No.: US 11,294,602 B2
(45) Date of Patent: *Apr. 5, 2022

(54) ETHERNET ENABLED SOLID STATE DRIVE (SSD)

(71) Applicant: Marvell Asia Pte. Ltd., Singapore (SG)

(72) Inventors: Shahar Noy, Los Gatos, CA (US); Noam Mizrahi, Modi'in (IL)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,320

(22) Filed: Mar. 16, 2020

(65) Prior Publication Data

US 2020/0293195 A1    Sep. 17, 2020

Related U.S. Application Data

(60) Provisional application No. 62/818,621, filed on Mar. 14, 2019.

(51) Int. Cl.
*G06F 3/06* (2006.01)
*G06F 12/02* (2006.01)
*G06F 13/42* (2006.01)

(52) U.S. Cl.
CPC .......... *G06F 3/067* (2013.01); *G06F 3/0679* (2013.01); *G06F 12/0246* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| 9,313,128 B2* | 4/2016 | Morimoto ............. H04L 43/026 |
| 9,785,355 B2 | 10/2017 | Huang |
| 10,162,793 B1 | 12/2018 | Bshara et al. |
| 10,423,358 B1* | 9/2019 | Foo ........................ G06F 3/0656 |
| 10,671,302 B1 | 6/2020 | Aggarwal et al. |
| 10,691,368 B2* | 6/2020 | Kachare ................ G06F 3/0634 |

(Continued)

FOREIGN PATENT DOCUMENTS

| WO | WO-2016/182756 | 11/2016 |
| WO | WO-2018/217316 | 11/2018 |

OTHER PUBLICATIONS

Hoff, Brandon, "Checklist for What's New in NVMeTM over Fabrics," website, NVM Express, retrieved from https://nvmexpress.org/checklist-for-whats-new-in-nvme-over-fabrics/ on Sep. 24, 2020, 3 pages (Oct. 29, 2018).

(Continued)

*Primary Examiner* — Elias Mamo

(57) ABSTRACT

A unitary solid state drive (SSD) assembly includes a non-volatile memory (NVM), and a processor communicatively coupled to the NVM. The processor is configured to implement a communication protocol configured for accessing solid state memories over a communication network. The unitary SSD assembly also includes a network interface device communicatively coupled to the processor, and network connector coupled to the network interface device. The network interface device is configured to communicate via a network fabric according to a network communication protocol. The NVM, the processor, and the network interface device are arranged in a unitary assembly.

32 Claims, 5 Drawing Sheets

(56) References Cited

U.S. PATENT DOCUMENTS

| | | | |
|---|---|---|---|
| 2005/0243818 A1* | 11/2005 | Foglar | H04L 49/351 |
| | | | 370/389 |
| 2015/0006663 A1* | 1/2015 | Huang | G06F 13/00 |
| | | | 709/213 |
| 2016/0085718 A1 | 3/2016 | Huang | |
| 2016/0127492 A1 | 5/2016 | Malwankar et al. | |
| 2016/0210062 A1* | 7/2016 | McCambridge | G06F 3/0613 |
| 2017/0149920 A1 | 5/2017 | Sammatshetti | |
| 2017/0286363 A1 | 10/2017 | Joshua et al. | |
| 2018/0046594 A1 | 2/2018 | Worley et al. | |
| 2018/0081565 A1 | 3/2018 | Tan et al. | |
| 2018/0101450 A1 | 4/2018 | Park et al. | |
| 2018/0107591 A1 | 4/2018 | Smith | |
| 2018/0284989 A1 | 10/2018 | Kachare et al. | |
| 2018/0284990 A1 | 10/2018 | Kachare et al. | |
| 2018/0285019 A1 | 10/2018 | Olarig et al. | |
| 2018/0321876 A1 | 11/2018 | Ballapuram et al. | |
| 2019/0107956 A1* | 4/2019 | Kachare | G06F 3/0688 |
| 2019/0163364 A1 | 5/2019 | Gibb et al. | |
| 2019/0250855 A1 | 8/2019 | Kachare et al. | |
| 2019/0272123 A1 | 9/2019 | Gissin et al. | |
| 2019/0317901 A1 | 10/2019 | Kachare et al. | |
| 2020/0125157 A1 | 4/2020 | Kachare et al. | |
| 2020/0225863 A1 | 7/2020 | Veluswamy et al. | |
| 2020/0225874 A1 | 7/2020 | Nimmagadda et al. | |

OTHER PUBLICATIONS

U.S. Appl. No. 16/820,308, Haimzon et al., "Transferring Data Between Solid State Drives (SSDs) Via a Connection Between the SSDs," filed Mar. 16, 2020.

U.S. Appl. No. 16/717,408, Noam Mizrahi, "Solid-State Drive with Initiator Mode," filed Dec. 17, 2019.

U.S. Appl. No. 16/817,846, Noam Mizrahi, "Solid-State Drive with Inhibitor Mode," filed Mar. 13, 2020.

International Search Report and Written Opinion in International Patent Application No. PCT/US2020/023013, dated May 28, 2020 (12 pages).

* cited by examiner

ETHERNET ENABLED SOLID STATE DRIVE (SSD)

CROSS REFERENCES TO RELATED APPLICATIONS

The present application claims the benefit of U.S. Provisional Patent Application No. 62/818,621, entitled "NVMe-oF Solid State Drive (SSD)," filed on Mar. 14, 2019, which is hereby incorporated by reference herein in its entirety.

FIELD OF TECHNOLOGY

The present disclosure relates generally to storage services, and in particular with a solid state drive (SSD) with a built-in network interface device to enable communication over a network fabric.

BACKGROUND

A host computer ("host") communicates with a solid state drive (SSD) to obtain data services provided by the SSD, such as reading data, storing data, and erasing data. The solid-state drive (SSD) is a data storage device that includes non-volatile memory, such as NAND (Not-And) Flash memory, to store persistent digital data. The SSD may be configured to emulate a hard disk drive (HDD), e.g., a device that stores persistent digital data on a magnetic surfaces of rapidly rotating platters. Current SSDs include one of three physical interfaces via which the SSDs can be accessed: serial attached small computer system interface (SAS), serial AT attachment (SATA), and peripheral component interconnect express (PCIe) (e.g., a U.2 connector).

Non-volatile memory express (NVMe) is a logical interface that defines a register level interface for accessing a non-volatile memory (e.g., an SSD) over a PCIe bus. As an example, a host computer may use NVMe to access a prior art SSD having a PCIe physical interface. A driver executed on the host computer converts NVMe commands to PCIe signals, and vice versa.

NVMe over Fabrics (NVMe-oF) is a protocol designed to use message-based commands to transfer data between a host computer and a target SSD or system over a network, such as Ethernet, Fibre Channel (FC) or InfiniBand, thus extending the distance over which SSDs can be accessed. NVMe-oF uses a message-based model for communication between a host and a target storage device (e.g., an SSD), and includes a transport-mapping mechanism for sending and receiving commands and responses related to memory operations. As an example, a host computer may use NVMe-oF to access a prior art SSD via a network, where the SSD is included in a storage subsystem having an NVMe-oF interface device. The NVMe-oF interface device converts NVMe commands in NVMe-oF messages from the host to PCIe signals, and converts PCIe signals to NVMe commands, and includes the NVMe commands in NVMe-oF messages to the host.

SUMMARY

In an embodiment, a unitary solid state drive (SSD) assembly comprises: a non-volatile memory (NVM); a processor communicatively coupled to the NVM and configured to implement a communication protocol configured for accessing solid state memories over a communication network; a network interface device communicatively coupled to the processor, wherein the network interface device is configured to communicate via a network fabric according to a network communication protocol, and wherein the NVM, the processor, and the network interface device are arranged in a unitary assembly. The unitary SSD assembly further comprises a network connector coupled to the network interface device.

In another embodiment, a method of accessing an NVM of a unitary SSD assembly includes: receiving, at a network interface device of the unitary SSD assembly, a packet that includes information related to accessing the NVM, the packet received from a network fabric communicatively coupled to the network interface device; determining, at the network interface device of the unitary SSD assembly, that a destination network address in a header of the packet matches a network address of the unitary SSD assembly; and in response to determining that the network address in the header of the packet matches the network address of the unitary SSD assembly: decapsulating, at a processor of the unitary SSD assembly, a data unit from the packet, the data unit corresponding to a communication protocol for accessing storage devices, and using information in the data unit to access the NVM.

DETAILED DESCRIPTION

In various embodiments described below, an SSD device includes a built-in network interface device (such as an Ethernet network interface device) for providing the SSD with connectivity to a network (such as an Ethernet network). At least in some embodiments, SSDs with built-in network interface devices enable easier and/or more affordable scalability of storage capacity. As an illustrative example, a storage subsystem comprises multiple such SSDs and a network fabric (e.g., including an Ethernet switch) that communicatively couples the SSDs and provides network access to the SSDs, according to an embodiment. The storage subsystem can be easily scaled by adding additional SSDs with built-in network interface devices and coupling such SSDs to the network fabric. Similarly, a storage system can be easily scaled additionally or alternatively by adding additional such storage subsystems.

Additionally, at least in some embodiments, SSDs with built-in network interface devices enable functions that prior art SSDs do not provide. As an illustrative example, a storage subsystem comprises multiple SSDs with respective built-in network interface devices, the multiple SSDs communicatively coupled via a network fabric, according to an embodiment. In such a storage subsystem, data can be copied, moved, etc., from one SSD to another via the fabric and without first transferring any of the data to a host computer.

Figure 1A:
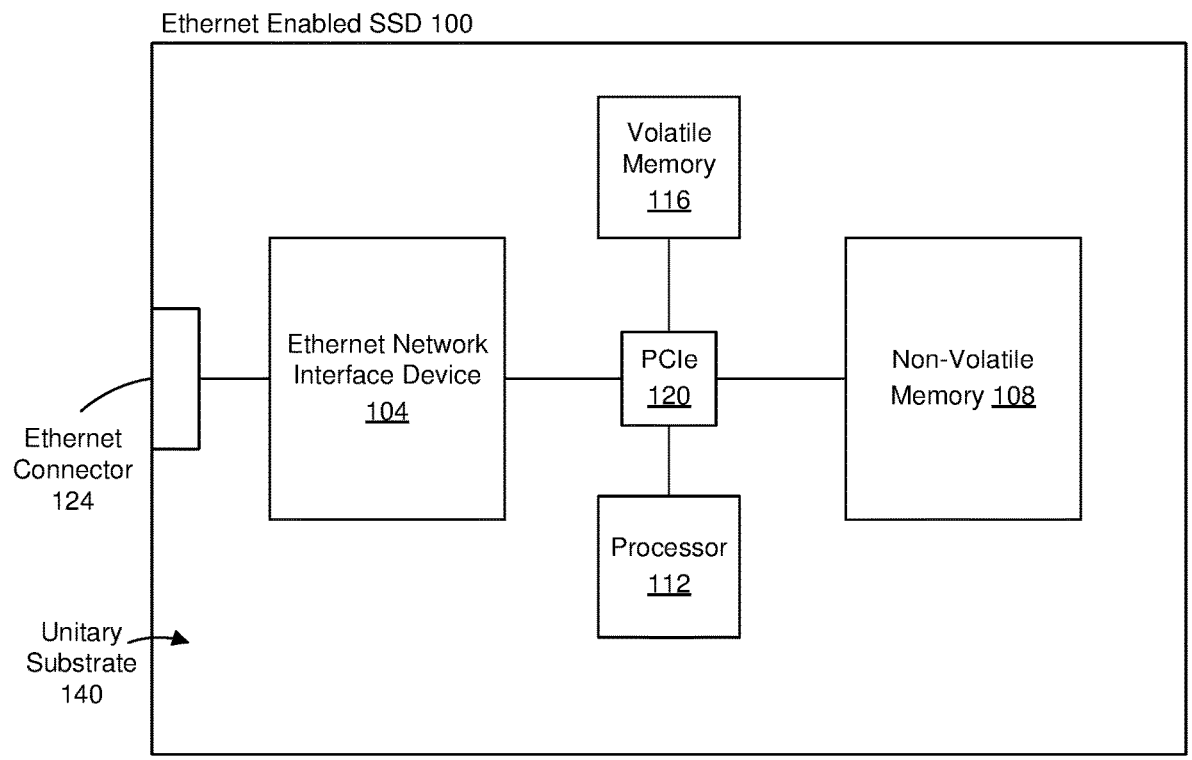
FIG. 1A is a diagram of an example unitary solid state drive (SSD) assembly that includes a built-in network interface device for communicatively coupling the unitary SSD assembly to a network fabric, according to an embodiment.

FIG. 1A is a simplified diagram of an example unitary SSD assembly 100 with a built-in network interface device, according to an embodiment. In the example unitary SSD assembly 100, the built in network interface device comprises an Ethernet network interface device 104, and FIG. 1A is described in the context of an Ethernet network for ease of explanation. In other embodiments, however, the built in network interface device comprises another suitable network interface device configured to communicatively couple to another suitable network fabric, such as a Fibre Channel (FC) network interface device configured to communicatively couple to an FC network fabric, an InfiniBand network interface device configured to communicatively couple to an InfiniBand network fabric, etc.

The unitary SSD assembly 100 also comprises a non-volatile memory (NVM) 108, such as a NAND (Not-And) Flash memory or another suitable solid state memory. In an embodiment, the NVM 108 comprises an array of NVM memories.

The unitary SSD assembly 100 additionally comprises a processor 112. In some embodiments, the processor 112 is configured to execute machine readable instructions stored in a memory (not shown) coupled to and/or integrated with the processor 112. The machine readable instructions, when executed by the processor 112, cause the processor 112 to implement one or more communication protocol layers, or sublayers thereof, related to accessing the NVM 108 via a network fabric, as will be described in more detail below. In some embodiments, the processor 112 additionally or alternatively comprises a hardware controller that includes one or more hardware state machines and/or one or more pipelined hardware processors configured to implement one or more communication protocol layers, or sublayers thereof, related to accessing the NVM 108 via a network fabric, as will be described in more detail below. In some embodiments, the processor 112 additionally or alternatively comprises one or more hardware tables configured for packet processing, memory management, etc. In some embodiments, the processor 112 is implemented on an application specific integrated circuit (ASIC).

In some embodiments, the processor 112 is configured to implement a memory controller to access the NVM 108. In other embodiments, the unitary SSD assembly 100 further comprises a memory controller (not shown) separate from the processor 112.

In some embodiments, the unitary SSD assembly 100 further comprises volatile memory 116, such as a random access memory (RAM) or another suitable volatile memory. The memory 116 is used for one or both of i) acting as a memory cache for the NVM 108, and ii) temporarily storing messages, commands, etc., generated by, or to be processed by, the processor 112, the messages, commands, etc., related to memory access operations, according to various embodiments. In some embodiments, the memory 116 is omitted from the unitary SSD assembly 100.

At least when at least two components of the SSD assembly 100 are included in separate integrated circuit (IC) devices and mounted on one or more printed circuit boards (PCBs) (or another suitable substrate), the at least two components are communicatively coupled by a PCIe network 120, which includes one or more PCIe busses and optionally one or more PCIe switches. For example, in an embodiment, the Ethernet network interface device 104, the NVM 108, and the processor 112 are communicatively coupled by the PCIe network. As another example, the Ethernet network interface device 104, the NVM 108, the processor 112, and the memory 116 are communicatively coupled by the PCIe network, according to another embodiment.

In some embodiments, one or more components of the SSD assembly 100 are implemented on a single integrated circuit (IC) device within a unitary IC chip package. For example, the Ethernet network interface device 104 and the processor 112 are implemented on a single IC device within a unitary IC chip package, and the Ethernet network interface device 104 and the processor 112 are not communicatively coupled via the PCIe network 120 but rather via an interface circuit on the single IC, according to an embodiment. In another embodiment, the Ethernet network interface device 104 and the processor 112 are implemented on a multi-chip module (MCM) within a unitary IC chip package, and the Ethernet network interface device 104 and the processor 112 are not communicatively coupled via the PCIe network 120 but rather via an interface circuit on the MCM, according to an embodiment.

In another embodiment, the Ethernet network interface device 104, the NVM 108, the processor 112, and the memory 116 (if included), are implemented on a single IC device within a unitary IC chip package, and the PCIe network 116 is omitted. In another embodiment, the Ethernet network interface device 104, the NVM 108, the processor 112, and the memory 116 (if included), are implemented in an MCM within a unitary IC chip package, and the PCIe network 116 is omitted.

In another embodiment, the Ethernet network interface device 104, the NVM 108, and the processor 112 are implemented on a single IC device within a unitary IC chip package, and the PCIe network 116 is optionally omitted. In another embodiment, the Ethernet network interface device 104, the NVM 108, and the processor 112 are implemented in an MCM within a unitary IC chip package, and the PCIe network 116 is optionally omitted.

In other embodiments, two or more of the components of the unitary SSD assembly 100 are implemented using stacked IC technology and included within a unitary IC chip package. Similarly, in some embodiments, two or more of the components of the unitary SSD assembly 100 are implemented using package on package (PoP) technology.

The unitary SSD assembly 100 also comprises an Ethernet connector 124 coupled to the Ethernet network interface device 104. In various embodiments, the Ethernet connector 124 comprises an RJ45 connector, an M8 connector, an M12 connector, or another suitable Ethernet connector.

In some embodiments, one or more IC chip packages and/or PoP modules that include at least the Ethernet network interface device 104, the NVM 108, the processor 112, and the memory 116 (if included), are mounted on a unitary substrate 140. In some embodiments that include the unitary substrate 140, the Ethernet connector 124 is also mounted on the unitary substrate 140. In other embodiments, the Ethernet connector 124 is not mounted on the unitary substrate 140. In an embodiment, the unitary substrate 140 comprises a PCB. In other embodiments, the unitary substrate 140 comprises another suitable substrate that is configured for mounting one or more IC chip packages and/or PoP modules.

In some embodiments, two or more IC chip packages and/or PoP modules that include at least two of the Ethernet network interface device 104, the NVM 108, the processor 112, and the memory 116 (if included), are mounted on two or more suitable substrates.

Figure 1B:
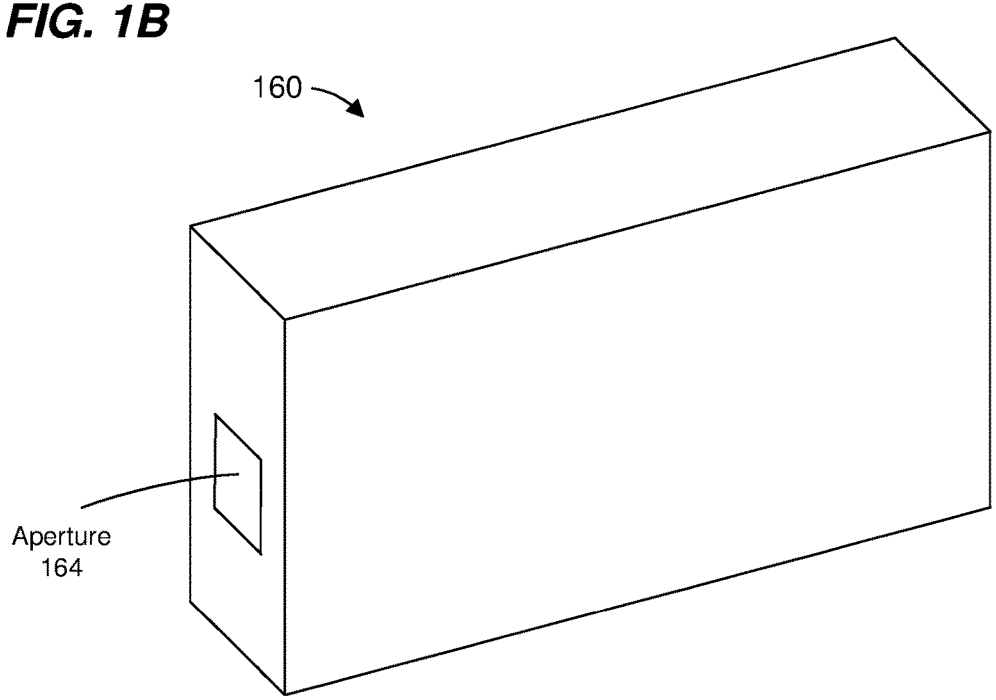
FIG. 1B is a diagram of an example housing that encloses components of the SSD assembly of FIG. 1A, according to an embodiment.

In some embodiments, the unitary SSD assembly 100 includes a housing that contains the Ethernet network interface device 104, the NVM 108, the processor 112, the PCIe network 116 (if included), and the memory 116 (if included). FIG. 1B is a diagram of an example housing 160 of the unitary SSD assembly 100, according to an embodiment. In an embodiment, the housing 160 encloses, at least partially, the Ethernet network interface device 104, the NVM 108, the processor 112, the PCIe network 116 (if included), and the memory 116 (if included).

In an embodiment, the housing 160 defines an aperture 164. The aperture 164 is shaped to accommodate the Ethernet connector 124, according to an embodiment. In some embodiments, the housing 160 also defines one or more other apertures (not shown) that serve various other purposes such as one or more of: i) accommodating other connectors (not shown), ii) providing ventilation, iii) providing access to components within the housing, etc.

As discussed above, although FIGS. 1A-B were described in the context of the built-in network interface device of the unitary SSD assembly comprising an Ethernet network interface device, in other embodiments the built-in network interface device of the unitary SSD assembly 100 comprises another suitable network interface device such as an FC network interface device configured to communicatively couple to an FC network fabric, an InfiniBand network interface device configured to communicatively couple to an InfiniBand network fabric, etc. In embodiments in which the unitary SSD assembly 100 comprises an FC network interface device, the connector 124 is a suitable FC connector such as a Lucent connector (LC) connector, a multiple-fiber push on (MPO) connector, or another suitable FC connector, and the aperture 164 is shaped to accommodate the FC connector. In embodiments in which the unitary SSD assembly 100 comprises an InfiniBand network interface device, the connector 124 is a suitable InfiniB and connector, and the aperture 164 is shaped to accommodate the InfiniB and connector.

In some embodiments, an SSD with a built-in network interface device is enclosed (at least partially) in a housing having a suitable form factor, such as a standard hard disk drive (HDD)/SSD form factor as defined by the Storage Networking Industry Association (SNIA), such as a 3.5-inch form factor (e.g., with maximum dimensions substantially equal to (i.e., within 1% of) a width of 4 inches, a depth of 5.75 inches, and height of 1.00 to 1.63 inches), a 3-inch long form factor (e.g., with maximum dimensions substantially equal to (i.e., within 1% of) a width of 3 inches, a depth of 5.36 inches, and height of 0.3 to 0.66 inches), a 3-inch short form factor (e.g., with maximum dimensions substantially equal to (i.e., within 1% of) a width of 3 inches, a depth of 3.89 inches, and height of 0.3 to 0.66 inches), a 1 U short form factor (e.g., with maximum dimensions substantially equal to (i.e., within 1% of) a width of 1.33 inches, a depth of 4.68 inches, and height of 0.37 inches), a 1 U long form factor (e.g., with maximum dimensions substantially equal to (i.e., within 1% of) a width of 1.51 inches, a depth of 12.55 inches, and height of 0.37 inches), a 2.5-inch form factor (e.g., with maximum dimensions substantially equal to (i.e., within 1% of) a width of 2.75 inches, a depth of 3.94 inches, and height of 0.37 to 0.75 inches), or a 1.8-inch form factor (e.g., with maximum dimensions substantially equal to (i.e., within 1% of) a width of 2.1 inches, a depth of 3.1 inches, and height of 0.2 inches).

In some embodiments, the housing has a maximum width of 4 inches, a maximum depth of 6 inches, and a maximum height of 2 inches.

In other embodiments, the housing has suitable dimensions than those discussed above.

In some embodiments, the unitary SSD assembly 100 does not include a housing such as the housing 160 of FIG. 1B. For example, in an embodiment, components of the unitary SSD assembly 100 such as described above (e.g., the Ethernet network interface device 104, the NVM 108, the processor 112, the PCIe network 116 (if included), the memory 116 (if included), and the connector 124) are mounted on a single unitary substrate such as a PCB. In another embodiment, a bracket is mounted to the single unitary substrate, the bracket shaped for mounting the unitary SSD assembly 100 to another PCB, to a housing of another device such as a server, a storage subsystem, etc. In some embodiments, the bracket defines an aperture that accommodates the connector 124. In some embodiments in which the single unitary substrate is mounted to the bracket, the connector 124 is mounted to the bracket and is not mounted to the single unitary substrate. In some embodiments, the PCB has a maximum width of 4 inches and a maximum depth of 6 inches. In other embodiments, the PCB has other suitable dimensions.

In another embodiment, the single unitary substrate is mounted within a frame (comprising metal, plastic, etc.). In an embodiment, the frame is configured for mounting the unitary SSD assembly 100 to another PCB, to a housing of another device such as a server, a storage subsystem, etc. In some embodiments, the frame defines an aperture that accommodates the connector 124. In some embodiments in which the single unitary substrate is mounted within a frame, the connector 124 is mounted to the frame and is not mounted to the single unitary substrate. In some embodiments, the frame has a maximum width of 4 inches and a maximum depth of 6 inches. In other embodiments, the PCB has other suitable dimensions.

As yet another example, in an embodiment, components of the unitary SSD assembly 100 such as described above (e.g., the Ethernet network interface device 104, the NVM 108, the processor 112, the PCIe network 116 (if included), the memory 116 (if included), and the connector 124) are mounted within a frame to form a unitary component. In an embodiment, the unitary component is configured for mounting to another PCB, to a housing of another device such as a server, a storage subsystem, etc. In some embodiments in which the components of the unitary SSD assembly 100 are mounted within a frame, two or more of the components of the unitary SSD assembly 100 are mounted to two or more PCBs, and the two or more PCBs are communicatively coupled such as by cables, ribbon cables, wires, etc.; the two or more PCBs are mounted within the frame to form the unitary component. In some embodiments, the frame has a maximum width of 4 inches and a maximum depth of 6 inches. In other embodiments, the PCB has other suitable dimensions.

Referring again to FIG. 1A, the Ethernet network interface device 104 is associated with one or more network addresses that uniquely identify the unitary SSD assembly 100 within a communication network, according to an embodiment. The network address is a suitable logical or physical address, such as a media access control (MAC) address, an Internet Protocol (IP) address, etc. In embodiments in which the network interface device 104 is an FC network interface device, the one or more network addresses include one or more FC addresses. In embodiments in which the network interface device 104 is an InfiniB and network interface device, the one or more network addresses include one or more local identifiers (LIDs).

In some embodiments, the network interface device 104 is not a general purpose network interface device 104, but rather is a reduced functionality (e.g., as compared to a general purpose network interface device) network interface that comprises network interface front end interface logic configured with functionality to interface a protocol specialized for accessing storage devices over a network fabric (e.g., NVMe-oF, NVMe over TCP (NVMe/TCP), etc.) with a network fabric protocol such as Ethernet, Fibre Channel, Infiniband, etc. In some embodiments, the network interface device 104 comprises Ethernet to NVMe-oF (or NVMe/TCP) front end interface logic. In other embodiments, the network interface device 104 comprises FC to NVMe-oF (and/or FC over TCP/IP (FCIP) front end interface logic. In other embodiments, the network interface device 104 comprises InfiniB and to NVMe-oF (and/or TCP/IP over InfiniB and (IPoIB) front end interface logic.

The Ethernet network interface device 104 is configured to implement an Ethernet communication protocol (e.g., providing services up to an including a data link layer in the Open Systems Interconnection (OSI) model), according to an embodiment. In an embodiment, the Ethernet network interface device 104 is configured to receive, from the processor 112, a data unit that is to be forwarded to a network fabric (e.g., an Ethernet fabric), encapsulate the data unit in an Ethernet frame, and transmit the Ethernet frame to the network fabric via the connector 124. Additionally, the Ethernet network interface device 104 is configured to receive, from the network fabric (e.g., the Ethernet fabric) and via the connector 124, an Ethernet frame, and determine whether a destination network address in the Ethernet frame matches a network address of the unitary SSD assembly 100, according to an embodiment. The Ethernet network interface device 104 is further configured to, when the destination network address in the Ethernet frame matches the network address of the unitary SSD assembly 100, decapsulate a data unit from the Ethernet frame and forward the data unit to the processor 112, e.g., via the PCIe network 120 (when present).

In embodiments in which the network interface device 104 comprises an FC network interface device, the FC network interface device 104 is configured to implement an FC communication protocol, according to an embodiment. In an embodiment, the FC network interface device 104 is configured to receive, from the processor 112, a data unit that is to be forwarded to a network fabric (e.g., an FC fabric), encapsulate the data unit in an FC frame, and transmit the FC frame to the network fabric via the connector 124. Additionally, the FC network interface device 104 is configured to receive, from the network fabric (e.g., the FC fabric) and via the connector 124, an FC frame, and determine whether a destination network address in the FC frame matches a network address of the unitary SSD assembly 100, according to an embodiment. The FC network interface device 104 is further configured to, when the destination network address in the FC frame matches the network address of the unitary SSD assembly 100, decapsulate a data unit from the FC frame and forward the data unit to the processor 112, e.g., via the PCIe network 120 (when present).

In embodiments in which the network interface device 104 comprises an InfiniB and network interface device, the InfiniB and network interface device 104 is configured to implement an InfiniB and communication protocol, according to an embodiment. In an embodiment, the InfiniBand network interface device 104 is configured to receive, from the processor 112, a data unit that is to be forwarded to a network fabric (e.g., an InfiniBand fabric), encapsulate the data unit in an InfiniBand packet, and transmit the InfiniB and packet to the network fabric via the connector 124. Additionally, the InfiniB and network interface device 104 is configured to receive, from the network fabric (e.g., the InfiniBand fabric) and via the connector 124, an InfiniBand packet, and determine whether a destination network address in the InfiniBand packet matches a network address of the unitary SSD assembly 100, according to an embodiment. The InfiniBand network interface device 104 is further configured to, when the destination network address in the FC frame matches the network address of the unitary SSD assembly 100, decapsulate a data unit from the InfiniBand packet and forward the data unit to the processor 112, e.g., via the PCIe network 120 (when present).

In an embodiment, the processor 112 is configured to implement one or more communication protocol layers above the communication protocol layer(s) implemented by the network interface device 104, the one or more communication protocol layers implemented by the processor 112 for facilitating the transfer of the data between the NVM 108 and an external device (external to the unitary SSD assembly 100), via a network fabric coupled to the connector 124. For example, the processor 112 implements an NVMe driver for converting NVMe commands and/or data to PCIe bus signals, and converting PCIe bus signals to NVMe commands and/or data, according to an embodiment. In some embodiments in which the unitary SSD assembly 100 omits a PCIe network, NVMe driver converts NVMe commands/data to signals for accessing the NVM 108, and converts signals from the NVM 108 to NVMe commands/data.

As another example, the processor 112 implements a Remote Direct Memory Access (RDMA) protocol for transferring data to or from the NVM 108, according to an embodiment. In various embodiments, the processor 112 implements RDMA over converged Ethernet (RoCE), RDMA over TCP/IP, etc.

As another example, the processor 112 implements an NVMe over Fabrics (NVMe-oF) protocol for facilitating transferring data between the NVM 108 with an external device (external to the unitary SSD assembly 100), via a network fabric coupled to the connector 124, according to an embodiment. For example, the processor 112 uses the NVMe-oF protocol to establish a logical connection with an external device (external to the unitary SSD assembly 100), via a network fabric coupled to the connector 124. As another example, the processor 112 uses the NVMe-oF protocol to exchange commands and/or data (associated with accessing memory devices) with an external device (external to the unitary SSD assembly 100), via a network fabric coupled to the connector 124.

In various other embodiments, the processor 112 additionally or alternatively implements one of, or any suitable combination of two or more of: i) RDMA over the User Data Protocol (UDP) as a transport layer, ii) iWARP (a networking protocol that implements RDMA over the Transmission Control Protocol (TCP) and the Internet Protocol (IP) (TCP/IP)), iii) NVMe over TCP as a transport layer (NVMe/TCP), etc.

As an illustrative example associated with transferring data from the NVM 108 to a memory in an external device (e.g., external to the unitary SSD assembly 100), the processor 112 uses the NVMe-oF protocol to open a logical connection to the external device over the network fabric. The logical connection is an NVMe-oF transport layer connection based on Ethernet, Fibre Channel, InfiniB and, etc., according to various illustrative embodiments. Alternatively, the connection 138 is based on RDMA, RoCEv2, iWARP, NVMe/TCP, or another suitable protocol, in other embodiments. The connection is opened prior to transfer of data from the NVM 108, in an embodiment.

As an illustrative example, the Ethernet interface device 104 receives an Ethernet packet from the network fabric via the connector 124. The Ethernet network interface device 104 decapsulates a capsule from the Ethernet packet, and provides the capsule to the processor 112. The capsule contains one or more commands such as an NVMe read command, data to be stored in the NVM 108, scatter gather lists (SGLs) which indicate network addresses of data in NVM 108 to be retrieved, etc. In response to contents of the capsule, the processor 112 (implementing the NVMe-oF protocol, the NVMe/TCP protocol, etc.) generates PCIe signals for accessing the NVM 108 according to the contents of the capsule. In some embodiments in which the PCIe network 120 is omitted, the processor 112 generates suitable signals for accessing the NVM 108 according to the contents of the capsule.

As another example, the processor 112 (implementing the NVMe-oF protocol, the NVMe/TCP protocol, etc.) generates a capsule (or a TCP/IP frame) that contains data read from the NVM 108. The processor 112 provides the capsule to the Ethernet network interface device 104, which generates an Ethernet packet that includes the capsule. The Ethernet interface device 104 then transmits the Ethernet packet to the network fabric via the connector 124.

Figure 2:
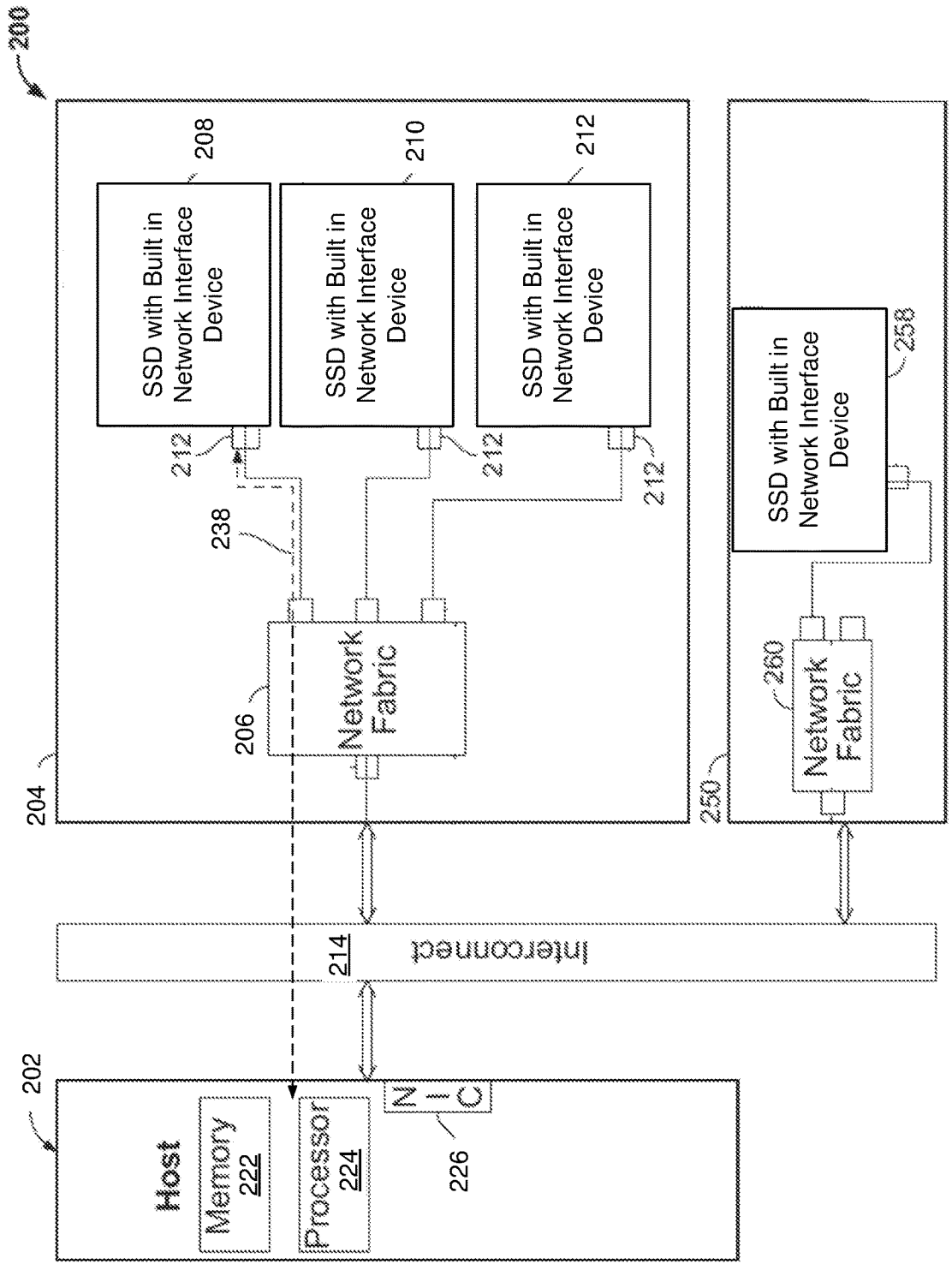
FIG. 2 is a diagram of an example storage system that utilizes the unitary SSD assembly of FIG. 1A, according to an embodiment.

FIG. 2 is a diagram of an example storage system 200 that utilizes unitary SSD assemblies such as the unitary SSD assembly 100 of FIG. 1, according to an embodiment. The example storage system 200 comprises a host 202 coupled to an interconnect 214 which in turn is coupled to a storage subsystem 204 having a network fabric 206 and three unitary SSD assemblies 208, 210, and 212. The interconnect 214 comprises a network such as a local area network (LAN), a wide area network (WAN), or another suitable interconnect or network that communicatively couples the host 202 and the storage subsystem 204. The interconnect 214 includes one or more intermediary devices, such as one or more interface switches and/or routers, coupled through wired and/or wireless interconnections, according to some embodiments.

One or both of the storage subsystem 204 and the host 202 are located in a rack for mounting multiple electronic modules, according to an embodiment. The rack includes multiple mounting slots referred to as bays, each designed to hold a hardware unit such as the host 202 or the storage subsystem 204. In some examples, the rack may include a top-of-rack switch which provides connectivity between the hardware units and a remote network and/or hardware units in other racks. In an embodiment, the interconnect 214 comprises a backplane of the rack. Further, more than one storage subsystem 204 and/or more than one host 202 are coupled to the interconnect 214, in various embodiments. Similarly, the storage subsystem 204 is communicatively coupled to another storage subsystem and/or another host in another rack (not shown), such as via a top-of-rack switch, according to some embodiments.

The host 202 includes any type of host, such as a computer processor or a network of computers and/or processors, according to various embodiments. Further, the host 202 is not necessarily limited to a single host device, and may represent a plurality of host devices. In an embodiment, the host 202 includes a memory 222 in the form of dynamic random access memory (DRAM) and/or other suitable memory, a processor 224, such as a central processing unit (CPU), and a network interface card (NIC) 226. The processor 224 is implemented on one or more IC devices and is configured to execute machine readable instructions stored in the memory 222 (or another memory (not shown) to perform arithmetical, logical, input/output (I/O) and other operations. To facilitate storage of data in the storage subsystem 204, the host 202 utilizes the NIC 226 to access memory in the storage subsystem 204. The NIC 226 facilitates transferring data over the interconnect 214 between the host 202 and the storage subsystem 204. In various embodiments, the NIC 226 comprises an Ethernet network interface device, an FC network interface device, an InfiniB and network interface device, etc.

The unitary SSD devices 208, 210, 212 are configured to establish logical connections with the host 202 via the network fabric 206, according to an embodiment. For example, as illustrated in FIG. 2, the processor 224 establishes a logical connection 238 with the unitary SSD device 208 via the network fabric 206. For example, the processor 224 establishes the logical connection 238 with the unitary SSD device 208 using NVMe-oF, NVMe/TCP, etc., in various embodiments, or using other suitable protocols in other embodiments.

The storage system 200 also includes a storage subsystem 250 coupled to the interconnect 214. The storage subsystem 250 comprises a unitary SSD assembly 258 (e.g., corresponding to the unitary SSD assembly 100 or another suitable unitary SSD assembly with a built-in network interface device), communicatively coupled to a network fabric 260. The host 202 is configured to establish a logical connection with the unitary SSD assembly 258 and to transfer data via the network fabric 260, according to an embodiment.

Figure 3:
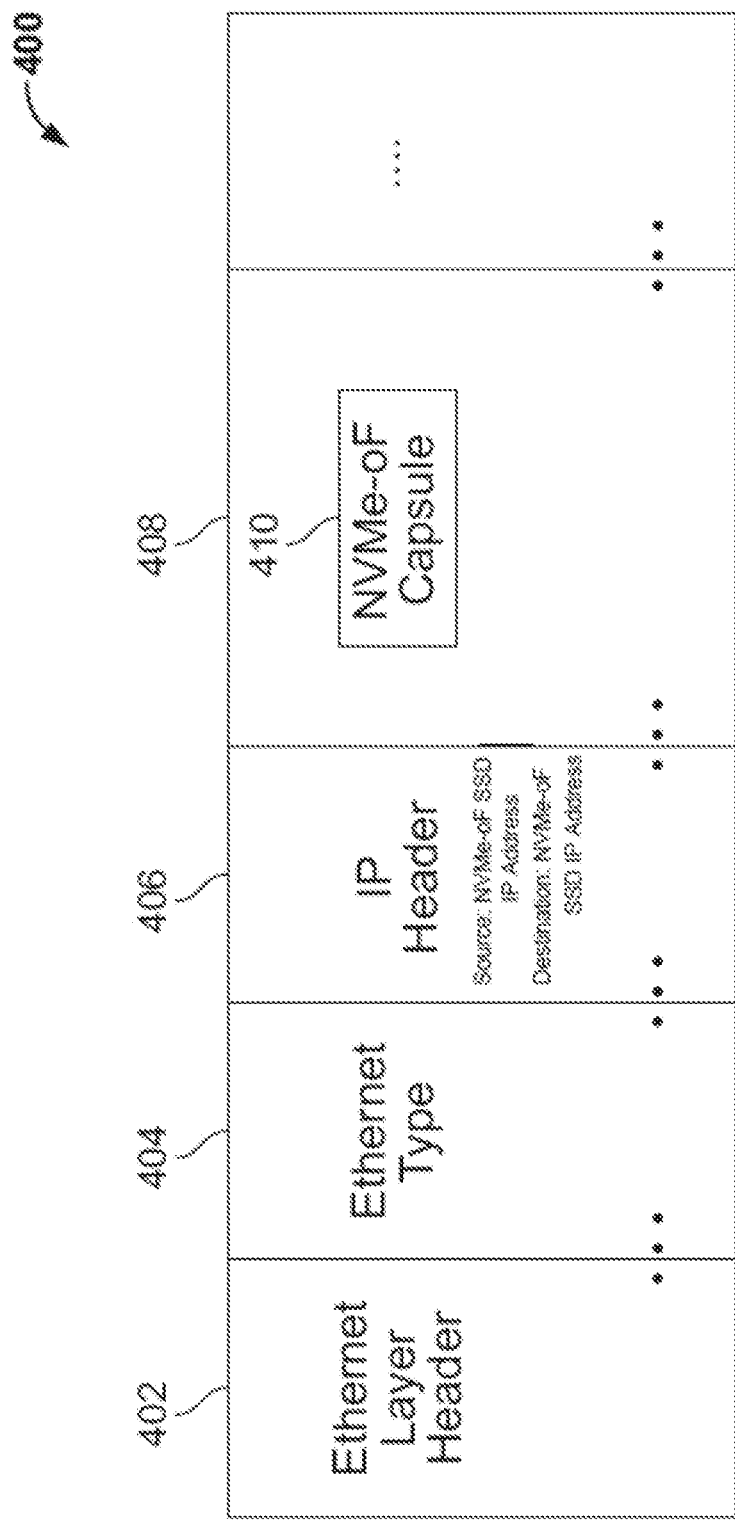
FIG. 3 is a diagram of an example network packet that the built-in network interface device of the unitary SSD assembly of FIG. 1A is configured to generate, transmit, receive, and/or process, according to an embodiment.

FIG. 3 is a diagram of an example Ethernet frame 400 that the unitary SSD assembly 100 is configured to generate and transmit, and receive and process, according to an embodiment. The frame 400 includes an Ethernet Layer 2 header 402 and an Ethernet type field 404 which indicate that the frame 400 is associated with an Ethernet protocol. In an embodiment, the header 402 includes a transmitter MAC address (e.g., a MAC address of a device is transmitting the Ethernet frame 400) and a receiver MAC address (e.g., a MAC address of a device that is to receive the Ethernet frame 400). The example frame 400 may include an IP header 406 which indicates a source IP network address and a destination IP network address. The source IP network address may be an IP address of a device that transmitted the frame 400 and the destination IP network address may be an IP address of a device to where the frame 400 is to be sent. The MAC addresses and/or the IP network addresses may facilitate directing the frame from the unitary SSD assembly 100 or to the SSD assembly via a network fabric such as the network fabric 206/260 (FIG. 2). In some embodiments, MAC addresses and/or the IP network addresses in the Ethernet frame 400 include a network address of a unitary SSD assembly. A payload 408 of the Ethernet frame 400 includes an NVMe-oF capsule 410 which includes NVMe commands, responses, SGLs, etc., associated with the transfer of the data to/from a unitary SSD assembly 100. The frame 400 may include other data as well such as port IDs associated with a logical connection between the unitary SSD assembly 100 and another network device to facilitate the routing of the frame to or from unitary SSD assembly over the logical connection.

Figure 4:
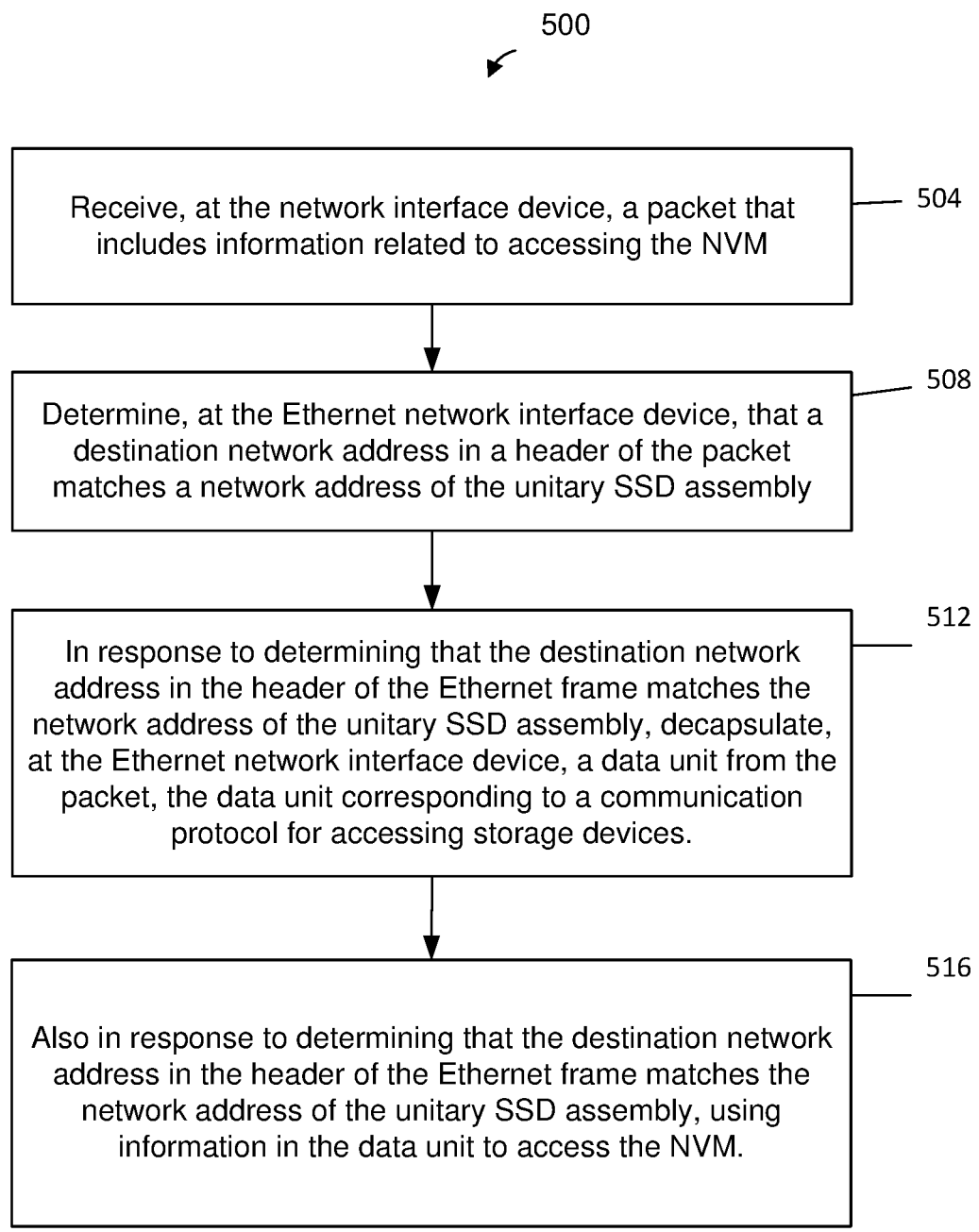
FIG. 4 is a flow diagram of an example method for accessing a non-volatile memory of a unitary SSD assembly, such as the unitary SSD assembly of FIG. 1A, according to an embodiment.

FIG. 4 is a flow diagram of an example method 500 for accessing an NVM of a unitary SSD assembly, such as the unitary SSD assembly discussed above with reference to FIG. 1A, according to an embodiment. The method 500 is implemented by the unitary SSD assembly 100 of FIG. 1, in some embodiments, and the method 500 is described with reference to FIG. 1 for ease of explanation. In other embodiments, the method 500 is implemented by another suitable unitary SSD assembly with a built-in network interface device configured to communicate via a network fabric.

At block 504, a network interface device (e.g., an Ethernet network interface device, an FC network interface device, an InfiniBand network interface device, etc.) of the unitary SSD assembly receives a packet (e.g., an Ethernet frame, an FC frame, an Infiniband packet, etc.) that includes information related to accessing the NVM. In an embodiment, the packet is received from a network fabric (e.g., an Ethernet fabric, an FC fabric, an InfiniB and fabric, etc.) communicatively coupled to the network interface device.

In an embodiment, the packet is received at block 504 via a network connector (e.g., an Ethernet connector, an FC connector, an InfiniBand connector, etc.) coupled to the network interface device.

At block 508, the Ethernet network interface device of the unitary SSD assembly determines that a destination network address in a header of the packet received at block 504 matches a network address of the unitary SSD assembly.

At block 512, in response to determining at block 508 that the destination network address in the header of the packet received at block 504 matches the network address of the unitary SSD assembly, the network interface device decapsulates a data unit from the packet received at bloc 504. In an embodiment, the data unit decapsulated from the packet corresponds to a communication protocol for accessing storage devices. In an embodiment, data unit decapsulated from the packet corresponds to the NVMe-oF protocol. In another embodiment, data unit decapsulated from the packet corresponds to the RDMA protocol. In another embodiment, data unit decapsulated from the packet corresponds to the RCoE protocol. In another embodiment, data unit decapsulated from the packet corresponds to the NVMe protocol.

At block 516, also in response to determining at block 508 that the destination network address in the header of the packet received at block 504 matches the network address of the unitary SSD assembly, a processor of the unitary SSD assembly uses information in the data unit to access the NVM.

In some embodiments, the NVM, the processor and the network interface device are integrated onto a unitary substrate, and using information in the data unit to access the NVM at block 516 comprises retrieving data from the NVM and transferring the retrieved data from the NVM to the processor via the unitary substrate without first transferring the retrieved data to any component not integrated onto the unitary substrate.

In some embodiments, the unitary substrate is a single PCB, and the NVM, the processor, and the network interface device are mounted on the single PCB, and transferring the retrieved data from the NVM to the processor via the unitary substrate comprises transferring the retrieved data from the NVM to the processor via the single PCB without first transferring the retrieved data to any component not mounted onto the single PCB.

In some embodiments, the NVM, the processor, and the network interface device are implemented on multiple IC chiplets, and the multiple IC chiplets are integrated onto the unitary substrate in an MCM; and transferring the retrieved data from the NVM to the processor via the unitary substrate comprises transferring the retrieved data from the NVM to the processor within the MCM without first transferring the retrieved data to any component outside of the MCM.

In some embodiments, the NVM, the processor, and the network interface device are included within a housing; and transferring the retrieved data from the NVM to the processor comprises transferring the retrieved data from the NVM to the processor without first transferring the retrieved data to any component outside of the housing.

In some embodiments, the NVM, the processor, and the network interface device are implemented on a single IC; and transferring the retrieved data from the NVM to the processor comprises transferring the retrieved data from the NVM to the processor without first transferring the retrieved data to any component not implemented on the single IC.

In some embodiments, the NVM, the processor, and the network interface device are implemented as at least two ICs in a multi-chip module (MCM); and transferring the retrieved data from the NVM to the processor comprises transferring the retrieved data from the NVM to the processor without first transferring the retrieved data to any component not in the MCM.

In some embodiments, the NVM, the processor, and the network interface device are implemented as at least two integrated circuits (ICs) in a unitary package on package (PoP) integrated circuit device; and transferring the retrieved data from the NVM to the processor comprises transferring the retrieved data from the NVM to the processor without first transferring the retrieved data to any component not in the PoP integrated circuit device.

In some embodiments, the method 500 further comprises: generating, at the processor, a further data unit corresponding to the communication protocol for accessing storage devices, the further data unit generated to include data retrieved from the NVM; providing, by the processor, the further data unit to the Ethernet network interface device; encapsulating, at the network interface device, the further data unit within a further packet (e.g., a further Ethernet frame, a further FC frame, a further Infiniband packet, etc.); and transmitting, by the network interface device, the further packet to the network fabric.

Figure 5:
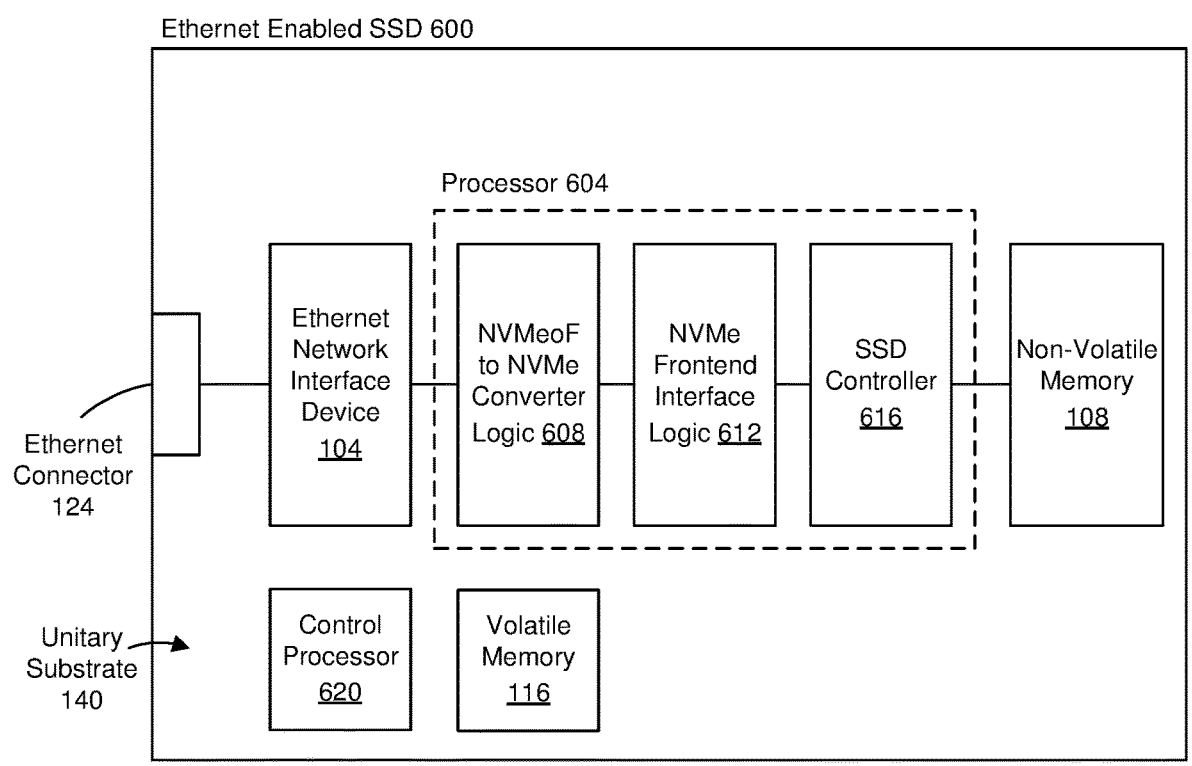
FIG. 5 is a diagram of another example unitary SSD assembly that includes a built-in network interface device for communicatively coupling the unitary SSD assembly to a network fabric, according to another embodiment.

FIG. 5 is a simplified diagram of another example unitary SSD assembly 600 with a built-in network interface device, according to an embodiment. The unitary SSD assembly 600 is a more specific embodiment of the unitary SSD assembly 100 of FIG. 1A, and like-numbered elements are not described in detail for purposes of brevity. Although FIG. 5 is discussed in the context of the Ethernet protocol, the unitary SSD assembly 600 is suitable for use with other network fabric protocols such as FC, InfiniBand, etc., according to various embodiments.

In some embodiment, the method 500 of FIG. 4 is implemented by the unitary SSD assembly 600 of FIG. 1. In other embodiments, the unitary SSD assembly implements other suitable methods other than the method 500.

In the example unitary SSD assembly 600, the built in network interface device comprises an Ethernet network interface device 104, and FIG. 1A is described in the context of an Ethernet network for ease of explanation. In other embodiments, however, the built in network interface device comprises another suitable network interface device configured to communicatively couple to another suitable network fabric, such as a FC network interface device configured to communicatively couple to an FC network fabric, an Infini-Band network interface device configured to communicatively couple to an InfiniB and network fabric, etc.

The unitary SSD assembly 600 comprises a processor 604. In an embodiment, the processor 604 corresponds to the processor 112 of FIG. 1A. The processor 604 comprises a plurality of hardware logic components including NVMe-oF to NVMe converter logic 608, NVMe front end interface logic 612, and SSD controller logic 616. The NVMe-oF to NVMe converter logic 608 is configured to implement NVMeoF protocol functions and to encapsulate/decapsulate NVMe commands/responses/data to/from NVMe-oF capsules, according to an embodiment. In another embodiment, the processor 604 comprises NVMe/TCP to NVMe converter logic 608 is configured to implement NVMe/TCP protocol functions and to encapsulate/decapsulate NVMe commands/responses/data to/from TCP/IP frames, according to an embodiment.

The NVMe front end interface logic 612 is configured to convert NVMe commands/responses/data to/from signals useable by the SSD controller 616, according to an embodiment. The SSD controller 616 is a suitable SSD controller configured to write data to and read data from the NVM memory 108.

In some embodiments, the SSD assembly also comprises a control processor 620 that is configured to perform functions such as administrative handling, monitoring of the network interface device 104 and/or the processor 604, set up of the network interface device 104, and/or the processor 604, and/or the NVM 108, etc. The control processor 620 is included as a component of the processor 604, in an embodiment. The control processor 620 is a separate component from the processor 604, in another embodiment. The control processor 620 is configured to execute machine readable instructions stored in a memory (not shown) coupled to and/or integrated with the control processor 620. The machine readable instructions, when executed by the control processor 620, cause the control processor 620 to perform functions such as administrative handling, monitoring of the network interface device 104 and/or the processor 604, set up of the network interface device 104, and/or the processor 604, and/or the NVM 108, etc.

In some embodiments, the SSDs with built-in network interface devices described herein are configured to perform acts such as described in U.S. patent application Ser. No. 16/820,308, filed on the same day as the present application, entitled "Transferring Data Between Solid State Drives (SSDs) via a Connection Between the SSDs," which is incorporated by reference herein in its entirety. In other embodiments, SSDs with built-in network interface devices described herein are configured to perform other suitable acts related to storing data in NVMs via a network fabric, retrieving data from NVMs via a network fabric, copying data between SSDs with built-in network interface devices over a network fabric, etc.

Embodiment 1: A unitary solid state drive (SSD) assembly, the unitary SSD assembly comprising: a non-volatile memory (NVM); a processor communicatively coupled to the NVM and configured to implement a communication protocol configured for accessing solid state memories over a communication network; a network interface device communicatively coupled to the processor, wherein the network interface device is configured to communicate via a network fabric according to a network communication protocol, and wherein the NVM, the processor, and the network interface device are arranged in a unitary assembly; and a network connector coupled to the network interface device.

Embodiment 2: The unitary SSD assembly of embodiment 1, wherein the processor is configured to implement a Non-Volatile Memory Express (NVMe) communication protocol.

Embodiment 3: The unitary SSD assembly of embodiment 2, wherein the processor is further configured to implement an NVMe over Fabric (NVMe-oF) communication protocol.

Embodiment 3A: The unitary SSD assembly of embodiment 2, wherein the processor is further configured to implement an NVMe over TCP (NVMe/TCP) communication protocol.

Embodiment 4: The unitary SSD assembly of any of embodiments 1-3A, further comprising: a peripheral component interconnect express (PCIe) bus system, the PCIe bus system interconnecting at least the NVM and the processor.

Embodiment 5: The unitary SSD assembly of embodiment any of embodiments 1-3, further comprising: a unitary substrate, wherein the NVM, the processor, and the network interface device are connected to or integrated onto the unitary substrate.

Embodiment 6: The unitary SSD assembly of embodiment 5, wherein: the unitary substrate is a single printed circuit board (PCB), wherein the NVM, the processor, and the network interface device are mounted on the single PCB.

Embodiment 7: The unitary SSD assembly of embodiment 5, wherein: the NVM, the processor, and the network interface device are implemented on multiple integrated circuit (IC) chiplets, and the multiple IC chiplets are integrated onto the unitary substrate in a multi-chip module (MCM).

Embodiment 8: The unitary SSD assembly of any of embodiments 1-7, further comprising: a housing, wherein the NVM, the processor, and the network interface device are included within the housing, and wherein the housing defines an aperture that accommodates the connector.

Embodiment 9: The unitary SSD assembly of any of embodiments 1-3, wherein: the NVM, the processor, and the network interface device are implemented on a single integrated circuit (IC).

Embodiment 10: The unitary SSD assembly of embodiment 9, wherein: wherein the single IC is included in a single IC chip package.

Embodiment 11: The unitary SSD assembly of any of embodiments 1-3, wherein: the NVM, the processor, and the network interface device are implemented as at least two integrated circuits (ICs) in a multi-chip module (MCM).

Embodiment 12: The unitary SSD assembly of embodiment 11, wherein: the MCM is included in a single IC chip package.

Embodiment 13: The unitary SSD assembly of embodiments 1-3, wherein: the NVM, the processor, and the network interface device are implemented as at least two integrated circuits (ICs) in a unitary package on package (PoP) integrated circuit device.

Embodiment 14: The unitary SSD assembly of embodiments 1-3, further comprising: a frame, wherein the NVM, the processor, and the network interface device are mounted to the frame.

Embodiment 15: The unitary SSD assembly of embodiment 14, wherein the network connector is mounted to the frame.

Embodiment 16: The unitary SSD assembly of embodiments 1-15, wherein: the network interface device comprises an Ethernet network interface device; and the network connector is an Ethernet network connector.

Embodiment 17: The unitary SSD assembly of embodiments 1-15, wherein: the network interface device comprises a Fibre Channel network interface device; and the network connector is a Fibre Channel network connector.

Embodiment 18: The unitary SSD assembly of embodiments 1-15, wherein: the network interface device comprises an InfiniBand network interface device; and the network connector is an InfiniB and network connector.

Embodiment 19: A method of accessing a non-volatile memory (NVM) of a unitary solid state drive (SSD) assembly, the method comprising: receiving, at a network interface device of the unitary SSD assembly, a packet that includes information related to accessing the NVM, the packet received from a network fabric communicatively coupled to the network interface device; determining, at the network interface device of the unitary SSD assembly, that a destination network address in a header of the packet matches a network address of the unitary SSD assembly; and in response to determining that the network address in the header of the packet matches the network address of the unitary SSD assembly: decapsulating, at a processor of the unitary SSD assembly, a data unit from the packet, the data unit corresponding to a communication protocol for accessing storage devices, and using information in the data unit to access the NVM.

Embodiment 20: The method of embodiment 19, further comprising: generating, at the processor, a further data unit corresponding to the communication protocol for accessing storage devices, the further data unit generated to include data retrieved from the NVM; providing, by the processor, the further data unit to the network interface device; encapsulating, at the network interface device, the further data unit within a further packet; and transmitting, by the network interface device, the further packet to the network fabric.

Embodiment 21: The method of either of embodiments 19 or 20, wherein decapsulating the data unit from the packet comprises decapsulating a data unit that includes information that conforms to a Non-Volatile Memory Express (NVMe) communication protocol.

Embodiment 22: The method of embodiment 21, wherein decapsulating the data unit from the packet comprises decapsulating a data unit that conforms to an NVMe over Fabric (NVMe-oF) communication protocol.

Embodiment 22A: The method of embodiment 21, wherein decapsulating the data unit from the packet comprises decapsulating a data unit that conforms an NVMe over TCP (NVMe/TCP) communication protocol.

Embodiment 23: The method of any of embodiments 19-22A, wherein using information in the data unit to access the NVM comprises: using a peripheral component interconnect express (PCIe) bus system of the unitary SSD assembly to access the NVM.

Embodiment 24: The method of any of embodiments 19-22, wherein: the NVM, the processor, and the network interface device are integrated onto a unitary substrate; and using information in the data unit to access the NVM comprises retrieving data from the NVM and transferring the retrieved data from the NVM to the processor via the unitary substrate without first transferring the retrieved data to any component not integrated onto the unitary substrate.

Embodiment 25: The method of embodiment 24, wherein: the unitary substrate is a single printed circuit board (PCB), and the NVM, the processor, and the network interface device are mounted on the single PCB; and transferring the retrieved data from the NVM to the processor via the unitary substrate comprises transferring the retrieved data from the NVM to the processor via the single PCB without first transferring the retrieved data to any component not mounted onto the single PCB.

Embodiment 26: The method of embodiment 24, wherein: the NVM, the processor, and the network interface device are implemented on multiple integrated circuit (IC) chiplets, and the multiple IC chiplets are integrated onto the unitary substrate in a multi-chip module (MCM); and transferring the retrieved data from the NVM to the processor via the unitary substrate comprises transferring the retrieved data from the NVM to the processor within the MCM without first transferring the retrieved data to any component outside of the MCM.

Embodiment 27: The method of embodiment 24, wherein: the NVM, the processor, and the network interface device are included within a housing; and transferring the retrieved data from the NVM to the processor comprises transferring the retrieved data from the NVM to the processor without first transferring the retrieved data to any component outside of the housing.

Embodiment 28: The method of embodiment 24, wherein: the NVM, the processor, and the network interface device are implemented on a single integrated circuit (IC); and transferring the retrieved data from the NVM to the processor comprises transferring the retrieved data from the NVM to the processor without first transferring the retrieved data to any component not implemented on the single IC.

Embodiment 29: The method of embodiment 24, wherein: the NVM, the processor, and the network interface device are implemented as at least two integrated circuits (ICs) in a multi-chip module (MCM); and transferring the retrieved data from the NVM to the processor comprises transferring the retrieved data from the NVM to the processor without first transferring the retrieved data to any component not in the MCM.

Embodiment 30: The method of embodiment 24, wherein: the NVM, the processor, and the network interface device are implemented as at least two integrated circuits (ICs) in a unitary package on package (PoP) integrated circuit device; and transferring the retrieved data from the NVM to the processor comprises transferring the retrieved data from the NVM to the processor without first transferring the retrieved data to any component not in the PoP integrated circuit device.

Embodiment 31: The method of any of embodiments 19-30, wherein: the network interface device comprises an Ethernet network interface device coupled to an Ethernet connector of the unitary SSD assembly; and receiving the packet that includes the information related to accessing the NVM from the network fabric comprises receiving, via the Ethernet connector, an Ethernet frame that includes the information related to accessing the NVM.

Embodiment 32: The method of any of embodiments 19-30, wherein: the network interface device comprises a Fibre Channel network interface device coupled to a Fibre Channel connector of the unitary SSD assembly; receiving the packet that includes the information related to accessing the NVM from the network fabric comprises receiving, via the Fibre Channel connector, a Fibre Channel packet that includes the information related to accessing the NVM.

Embodiment 33: The method of any of embodiments 19-30, wherein: the network interface device comprises an InfiniB and network interface device coupled to an InfiniB and connector of the unitary SSD assembly; and receiving the packet that includes the information related to accessing the NVM from the network fabric comprises receiving, via the InfiniB and connector, an InfiniBand packet that includes the information related to accessing the NVM.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A unitary solid state drive (SSD) assembly, the unitary SSD assembly comprising:
    a first non-volatile memory (NVM);
    a processor communicatively coupled to the first NVM and configured to implement a communication protocol configured for accessing solid state memories over a communication network;
    a network interface device communicatively coupled to the processor, wherein i) the network interface device is configured to communicate via a network fabric according to an NVM express over Fabrics (NVMe-oF) communication protocol ii) the processor is configured to cause data to be copied from the first NVM to a second NVM via the network fabric in accordance with the NVMe-oF communication protocol, and wherein the first NVM, the processor, and the network interface device are connected to or integrated onto a unitary substrate; and
    a network connector coupled to the network interface device.

2. The unitary SSD assembly of claim 1, wherein the processor is configured to implement a Non-Volatile Memory Express (NVMe) communication protocol.

3. The unitary SSD assembly of claim 2, wherein the processor is further configured to implement the NVMe-oF communication protocol.

4. The unitary SSD assembly of claim 1, further comprising:
    a peripheral component interconnect express (PCIe) bus system, the PCIe bus system interconnecting at least the first NVM and the processor.

5. The unitary SSD assembly of claim 1, wherein:
    the unitary substrate is a single printed circuit board (PCB), wherein the first NVM, the processor, and the network interface device are mounted on the single PCB.

6. The unitary SSD assembly of claim 1, wherein:
    the first NVM, the processor, and the network interface device are implemented on multiple integrated circuit (IC) chiplets, and the multiple IC chiplets are integrated onto the unitary substrate in a multi-chip module (MCM).

7. The unitary SSD assembly of claim 1, further comprising:
    a housing, wherein the first NVM, the processor, and the network interface device are included within the housing, and wherein the housing defines an aperture that accommodates the connector.

8. The unitary SSD assembly of claim 1, wherein:
    the first NVM, the processor, and the network interface device are implemented on a single integrated circuit (IC).

9. The unitary SSD assembly of claim 8, wherein:
    wherein the single IC is included in a single IC chip package.

10. The unitary SSD assembly of claim 1, wherein:
    the first NVM, the processor, and the network interface device are implemented as at least two integrated circuits (ICs) in a multi-chip module (MCM).

11. The unitary SSD assembly of claim 10, wherein:
    the MCM is included in a single IC chip package.

12. The unitary SSD assembly of claim 1, wherein:
    the first NVM, the processor, and the network interface device are implemented as at least two integrated circuits (ICs) in a unitary package on package (PoP) integrated circuit device.

13. The unitary SSD assembly of claim 1, further comprising:
    a frame, wherein the first NVM, the processor, and the network interface device are mounted to the frame.

14. The unitary SSD assembly of claim 13, wherein the network connector is mounted to the frame.

15. The unitary SSD assembly of claim 1, wherein:
    the network interface device comprises an Ethernet network interface device; and
    the network connector is an Ethernet network connector.

16. The unitary SSD assembly of claim 1, wherein:
    the network interface device comprises a Fibre Channel network interface device; and
    the network connector is a Fibre Channel network connector.

17. The unitary SSD assembly of claim 1, wherein:
    the network interface device comprises an InfiniBand network interface device; and
    the network connector is an InfiniB and network connector.

18. A method of accessing a first non-volatile memory (NVM) of a unitary solid state drive (SSD) assembly, the method comprising:
    receiving, at a network interface device of the unitary SSD assembly, a packet that includes information related to accessing the first NVM, the packet received from a network fabric communicatively coupled to the network interface device, wherein i) the network interface device is configured to communicate via a network fabric according to an NVM express over Fabrics (NVMe-OF) communication protocol and ii) the information is for copying data from the first NVM to a second NVM via the network fabric;
    determining, at the network interface device of the unitary SSD assembly, that a destination network address in a header of the packet matches a network address of the unitary SSD assembly; and
    in response to determining that the network address in the header of the packet matches the network address of the unitary SSD assembly:

decapsulating, at a processor of the unitary SSD assembly, a data unit from the packet, the data unit corresponding to a communication protocol for accessing storage devices, and
using information in the data unit to copy the data from the first NVM to the second NVM via the network fabric in accordance with the NVMe-oF communication protocol;
wherein the first NVM, the processor and the network interface are connected to or integrated onto a unitary substrate.

19. The method of claim 18, further comprising:
generating, at the processor, a further data unit corresponding to the communication protocol for accessing storage devices, the further data unit generated to include data retrieved from the first NVM;
providing, by the processor, the further data unit to the network interface device;
encapsulating, at the network interface device, the further data unit within a further packet; and
transmitting, by the network interface device, the further packet to the network fabric.

20. The method of claim 18, wherein decapsulating the data unit from the packet comprises decapsulating a data unit that includes information that conforms to a Non-Volatile Memory Express (NVMe) communication protocol.

21. The method of claim 20, wherein decapsulating the data unit from the packet comprises decapsulating a data unit that conforms to the NVMe-oF communication protocol.

22. The method of claim 18, wherein using information in the data unit to access the first NVM comprises:
using a peripheral component interconnect express (PCIe) bus system of the unitary SSD assembly to access the first NVM.

23. The method of claim 18, wherein:
the first NVM, the processor, and the network interface device are integrated onto a unitary substrate; and
using information in the data unit to access the first NVM comprises retrieving data from the first NVM and transferring the retrieved data from the NVM to the processor via the unitary substrate without first transferring the retrieved data to any component not integrated onto the unitary substrate.

24. The method of claim 23, wherein:
the unitary substrate is a single printed circuit board (PCB), and the first NVM, the processor, and the network interface device are mounted on the single PCB; and
transferring the retrieved data from the first NVM to the processor via the unitary substrate comprises transferring the retrieved data from the first NVM to the processor via the single PCB without first transferring the retrieved data to any component not mounted onto the single PCB.

25. The method of claim 23, wherein:
the first NVM, the processor, and the network interface device are implemented on multiple integrated circuit (IC) chiplets, and the multiple IC chiplets are integrated onto the unitary substrate in a multi-chip module (MCM); and
transferring the retrieved data from the first NVM to the processor via the unitary substrate comprises transferring the retrieved data from the first NVM to the processor within the MCM without first transferring the retrieved data to any component outside of the MCM.

26. The method of claim 23, wherein:
the first NVM, the processor, and the network interface device are included within a housing; and
transferring the retrieved data from the first NVM to the processor comprises transferring the retrieved data from the first NVM to the processor without first transferring the retrieved data to any component outside of the housing.

27. The method of claim 23, wherein:
the first NVM, the processor, and the network interface device are implemented on a single integrated circuit (IC); and
transferring the retrieved data from the first NVM to the processor comprises transferring the retrieved data from the first NVM to the processor without first transferring the retrieved data to any component not implemented on the single IC.

28. The method of claim 23, wherein:
the first NVM, the processor, and the network interface device are implemented as at least two integrated circuits (ICs) in a multi-chip module (MCM); and
transferring the retrieved data from the first NVM to the processor comprises transferring the retrieved data from the first NVM to the processor without first transferring the retrieved data to any component not in the MCM.

29. The method of claim 23, wherein:
the first NVM, the processor, and the network interface device are implemented as at least two integrated circuits (ICs) in a unitary package on package (PoP) integrated circuit device; and
transferring the retrieved data from the first NVM to the processor comprises transferring the retrieved data from the first NVM to the processor without first transferring the retrieved data to any component not in the PoP integrated circuit device.

30. The method of claim 18, wherein:
the network interface device comprises an Ethernet network interface device coupled to an Ethernet connector of the unitary SSD assembly; and
receiving the packet that includes the information related to accessing the first NVM from the network fabric comprises receiving, via the Ethernet connector, an Ethernet frame that includes the information related to accessing the first NVM.

31. The method of claim 18, wherein:
the network interface device comprises a Fibre Channel network interface device coupled to a Fibre Channel connector of the unitary SSD assembly;
receiving the packet that includes the information related to accessing the first NVM from the network fabric comprises receiving, via the Fibre Channel connector, a Fibre Channel packet that includes the information related to accessing the first NVM.

32. The method of claim 18, wherein:
the network interface device comprises an InfiniB and network interface device coupled to an InfiniB and connector of the unitary SSD assembly; and
receiving the packet that includes the information related to accessing the first NVM from the network fabric comprises receiving, via the InfiniB and connector, an InfiniB and packet that includes the information related to accessing the first NVM.

* * * * *